United States Patent

Suzuki et al.

[11] Patent Number: 6,061,898
[45] Date of Patent: May 16, 2000

[54] APPARATUS AND METHOD OF LOADING LENS-FITTED PHOTO FILM UNIT WITH PHOTO FILM

[75] Inventors: Chiaki Suzuki; Yuzo Tsunekawa, both of Kanagawa, Japan

[73] Assignee: Fuji Photo Film Co., Ltd., Kanagawa, Japan

[21] Appl. No.: 09/150,893

[22] Filed: Sep. 10, 1998

Related U.S. Application Data

[62] Division of application No. 08/865,831, May 30, 1997, Pat. No. 5,953,806, which is a division of application No. 08/605,717, Feb. 21, 1996, Pat. No. 5,689,876, which is a continuation of application No. 08/247,558, May 23, 1994, abandoned.

[30] Foreign Application Priority Data

May 21, 1993 [JP] Japan .................................. 5-120225

[51] Int. Cl.⁷ .................................................. B23P 21/00
[52] U.S. Cl. ................................ 29/722; 29/783; 29/785; 29/792; 29/806; 29/532.7
[58] Field of Search ............................. 29/430, 722, 771, 29/783, 785, 791, 792, 806; 53/430, 449, 467; 242/532.7

[56] References Cited

U.S. PATENT DOCUMENTS

| | | | |
|---|---|---|---|
| 4,884,087 | 11/1989 | Mochida et al. | 354/75 |
| 4,972,649 | 11/1990 | Mochida et al. | 53/430 |
| 5,689,876 | 11/1997 | Suzuki et al. | 29/722 |

*Primary Examiner*—Joseph M. Gorski
*Attorney, Agent, or Firm*—Sughrue, Mion, Zinn, Macpeak & Seas, PLLC

[57] ABSTRACT

An apparatus for assembling a photo film unit has a dark box, which has supply openings into which parts are supplied, and an exit opening from which the body loaded with the photo film is exited. Intermediate cells of the dark box shield ambient light and include interlocked outer shutter plates and inner shutter plates which are disposed in the supply openings and the exit opening. A cassette supplying loader and a robot hand transfer the cassette into the dark box, while a leading tongue of the photo film is protruded from the cassette shell, with a remaining portion of the photo film contained as a roll. A roll forming fork device winds the photo film to a predetermined length from the cassette and forms the photo film into the roll. A photo film mounting mechanism swings the roll and the cassette shell together to change orientation thereof, and loads the roll and the cassette shell into the body.

12 Claims, 10 Drawing Sheets

APPARATUS AND METHOD OF LOADING LENS-FITTED PHOTO FILM UNIT WITH PHOTO FILM

This is a divisional of application Ser. No. 08/865,831, filed May 30, 1997, and now U.S. Pat. No. 5,953,806 which is a divisional of Ser. No. 08/605,717, filed Feb. 21, 1996, and now U.S. Pat. No. 5,689,876 which is a continuation of Ser. No. 08/247,558, filed May 23, 1994 and now abandoned.

BACKGROUND OF THE INVENTION

1. Field of the Invention

The present invention relates to an apparatus and a method of loading a lens-fitted photo film unit with photo film. More particularly the present invention relates to an improvement of a photo film loading apparatus and a method in which the loading process is highly automated.

2. Description of the Related Art

Known lens-fitted photo film units (hereinafter referred to simply as photo film units) are disclosed in U.S. Pat. Nos. 4,884,087 and 4,972,649 (both corresponding to Japanese Patent Publication No. 2-32615), and are now available commercially, e.g., under the trade name "Fujicolor Quick Snap" (manufactured by Fuji Photo Film Co., Ltd.). Such photo film units are a single-use camera pre-loaded with a photo filmstrip (hereinafter referred to as photo film) in a cassette of a 135-type, as defined by ISO 1007, 1979 version, and incorporate a taking lens, a shutter device, and other mechanisms required for photography. The photo film unit has a mechanism for winding the photo film, but lacks a mechanism of feeding the film in a direction reverse to the winding direction, to reduce the cost of production. A user who has purchased the photo film unit winds the photo film frame by frame back into the cassette after each exposure. In production of the photo film unit, a loading apparatus draws the photo film out of a cassette shell, in a darkroom, in the form of a roll, and loads a photo film chamber with the roll of the photo film, while loading a cassette containing chamber with the cassette shell.

To form the roll from the drawn photo film, the loading apparatus has a station for winding the photo film. The roll forming station has a shaft device on which a leader of the photo film is secured. Although the roll is formed in the darkroom, a manual operation in an illuminated room is conventionally required before forming the roll. With the cassette shell set in the roll forming station, the manual operation pulls a predetermined length of the leader out of the cassette shell, and secures the leader of the photo film on the shaft device. The conventional operation of loading of the photo film requires a great deal of time. The length of pulling the leader from the cassette shell tends to change due to changes in the manual operation. A pulled portion on the leader is exposed to ambient light, and fogged. Accordingly a length of the photo film usable for the exposures is not constant. An available maximum number of exposures cannot exceed a standard number of which exposures could be safely taken without being fogged.

SUMMARY OF THE INVENTION

In view of the foregoing problems, an object of the present invention is to provide an apparatus and a method of loading a lens-fitted photo film unit with photo film, in which the loading process is highly automated.

Another object of the present invention is to provide an apparatus and a method of loading a lens-fitted photo film unit with photo film, which is capable of producing a photo film unit in which an available maximum number of exposures may be maximized.

In order to achieve the above and other objects and advantages of this invention, a dark box is provided, in which there is a light-shielded compartment and first to Nth intermediate cells individually defined around a periphery of the compartment. First to Nth outer openings are formed in an outer wall of the dark box and in correspondence with the respective first to Nth intermediate cells. First to Nth outer shutter plates are disposed in the respective first to Nth outer openings in openable fashion. First to Nth inner openings are formed in respective walls between the compartment and the respective first to Nth intermediate cells. First to Nth inner shutter plates are disposed in the respective first to Nth inner openings in openable fashion.

The main body is transferred into the first intermediate cell through the first outer opening while the first outer shutter plate is open. The main body is transferred into the compartment from the first intermediate cell while the first inner shutter plate is open after the first outer shutter plate is closed, The main body is set on a consecutive conveyor device while being shielded from light by the dark box. The consecutive conveyor device is driven periodically, to pass the main body from the first intermediate cell sequentially through positions of the second to Nth intermediate cells. The photo film cassette is transferred into the second intermediate cell through the second outer opening while the second outer shutter plate is open. The photo film cassette is transferred into the compartment from the second intermediate cell while the second inner shutter plate is open after the second outer shutter plate is closed.

A leader of the photo film is pulled out of the photo film cassette supplied from the second intermediate cell. The leader is secured on a rotary shaft device while the photo film cassette is supported. The rotary shaft device is rotated to wind the photo film thereabout. The photo film cassette and the rotary shaft device are shifted together toward the main body. The photo film cassette is mounted into the cassette containing chamber in the main body. The photo film drawn out of the photo film cassette is mounted into the photo film chamber in the main body. The main body is transferred, with the photo film cassette and the photo film mounted thereon, into the Nth intermediate cell through the Nth inner opening while the Nth inner shutter plate is open. The main body is transferred from the Nth intermediate cell through the Nth outer opening while the Nth outer shutter plate is open after the Nth inner shutter plate is closed.

In the present invention, the loading processes are highly automated. Also, it is possible to produce the photo film unit in which an available maximum number of exposures may be maximized.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT OF THE PRESENT INVENTION

Figure 1:
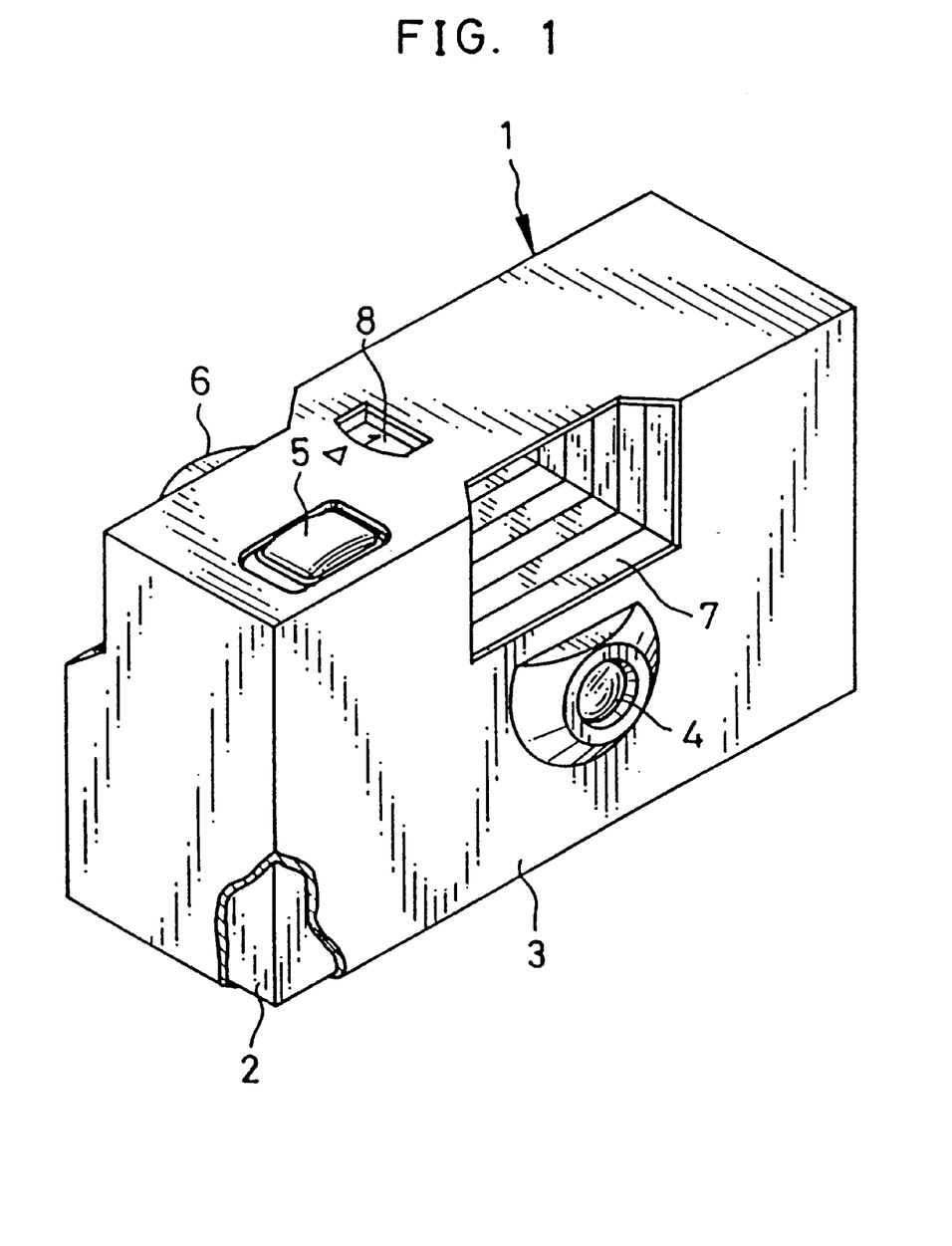
FIG. 1 is a perspective view illustrating an example of a lens-fitted photo film unit to be produced by a loading apparatus of the invention.

FIG. 1 illustrates a lens-fitted photo film unit 1 to be produced by the assembling apparatus of the preferred embodiment. A photo film housing 2 is generally formed from resin, and packaged in a cardboard wrapper 3. The housing 2 has a taking lens 4, a shutter button 5, a photo film winding wheel 6, a viewfinder 7, and an indicator 8 which shows the number of remaining frames photographable on photo film 45 (see FIG. 3). The packaging 3 has openings which correspond with those outside the housing 2.

Figure 2:
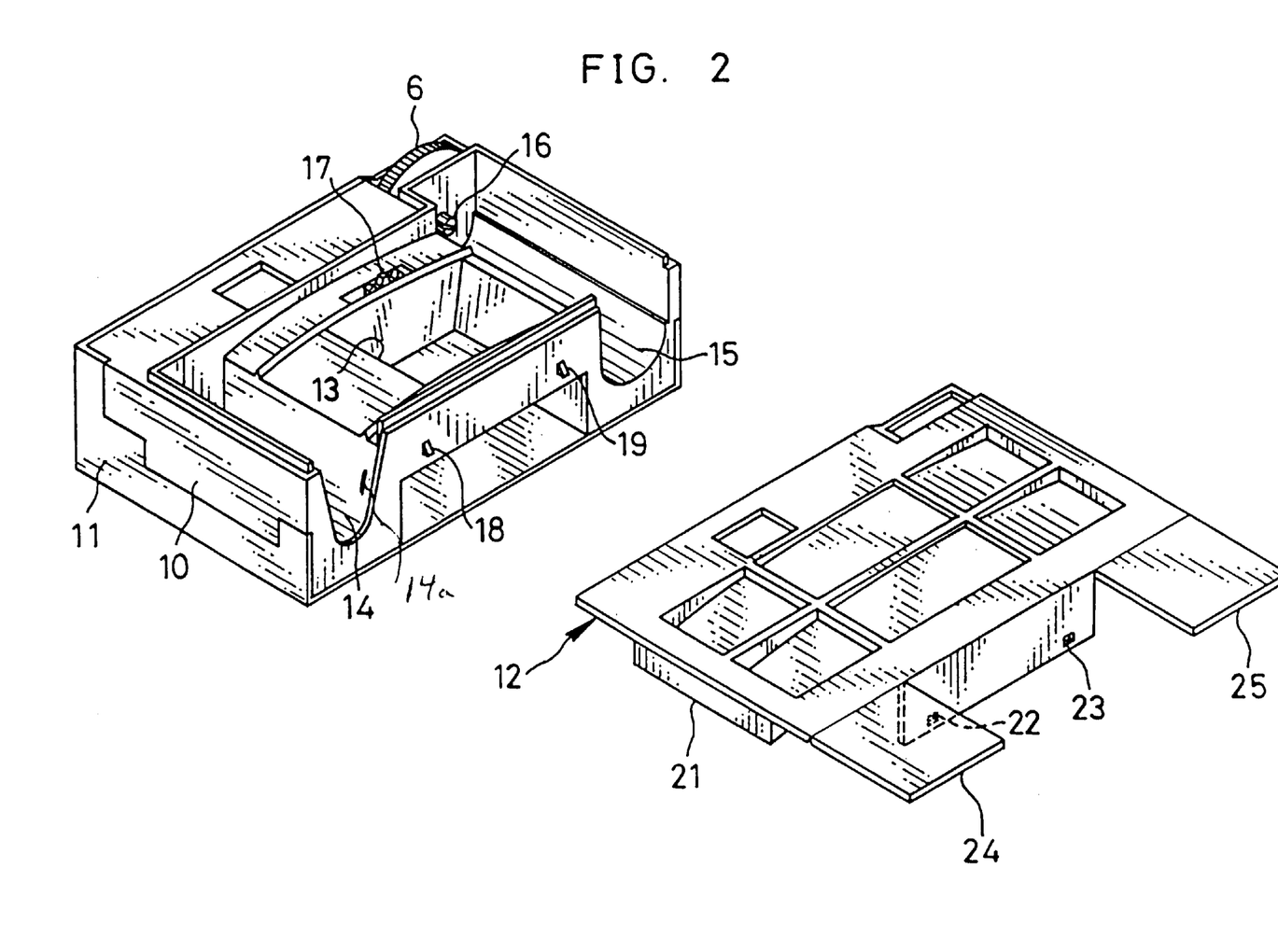
FIG. 2 is a perspective view illustrating a main body and a rear cover of the photo film unit.

The housing 2 is constituted of a main body 10, with front and rear covers 11 and 12 secured thereto (see FIG. 2). The main body 10 has an exposure frame 13, a photo film chamber 14 and a cassette containing chamber 15. The cassette containing chamber 15 has a fork 16 projected into it to be engaged with a spool of a cassette. The fork 16 is integral with the winding wheel 6.

A stopper 14a is formed on the main body 10 at a lower portion of the film chamber 14. After a roll 62 of the photo film 45 (See FIG. 6) is mounted in the photo film chamber 14, the stopper 14a contacts the roll 62, resists a force of withdrawing a fork device 63 having inserted the roll 62, and ensures removal of the fork device 63 from the roll 62. Over the exposure frame 13 is disposed a sprocket wheel 17, which meshes with perforations 45a formed in the film 45 (see FIG. 5A), and is driven to rotate in response to movement of the photo film 45. On a bottom portion of the main body 10 are formed projections 18 and 19, which are used for retention between the main body 10 and the rear cover 12 after loading of the photo film 45.

On the inside of the rear cover 12 is formed a rear regulating face 21, which has a curve in correspondence with the rear of the exposure frame 13 as shown, and contacts the photo film 45 to position it on the exposure frame 13. The bottom of the rear cover 12 includes holes 22 and 23 to be engaged with the projections 18 and 19, and bottom lids 24 and 25, which are retained on the main body 10 by use of retaining hooks which are omitted from the drawing. The bottom lid 24 encloses the bottom of the photo film chamber 14 in light-tight fashion. Similarly the bottom lid 25 encloses the bottom of the cassette containing chamber 15.

Figure 3:
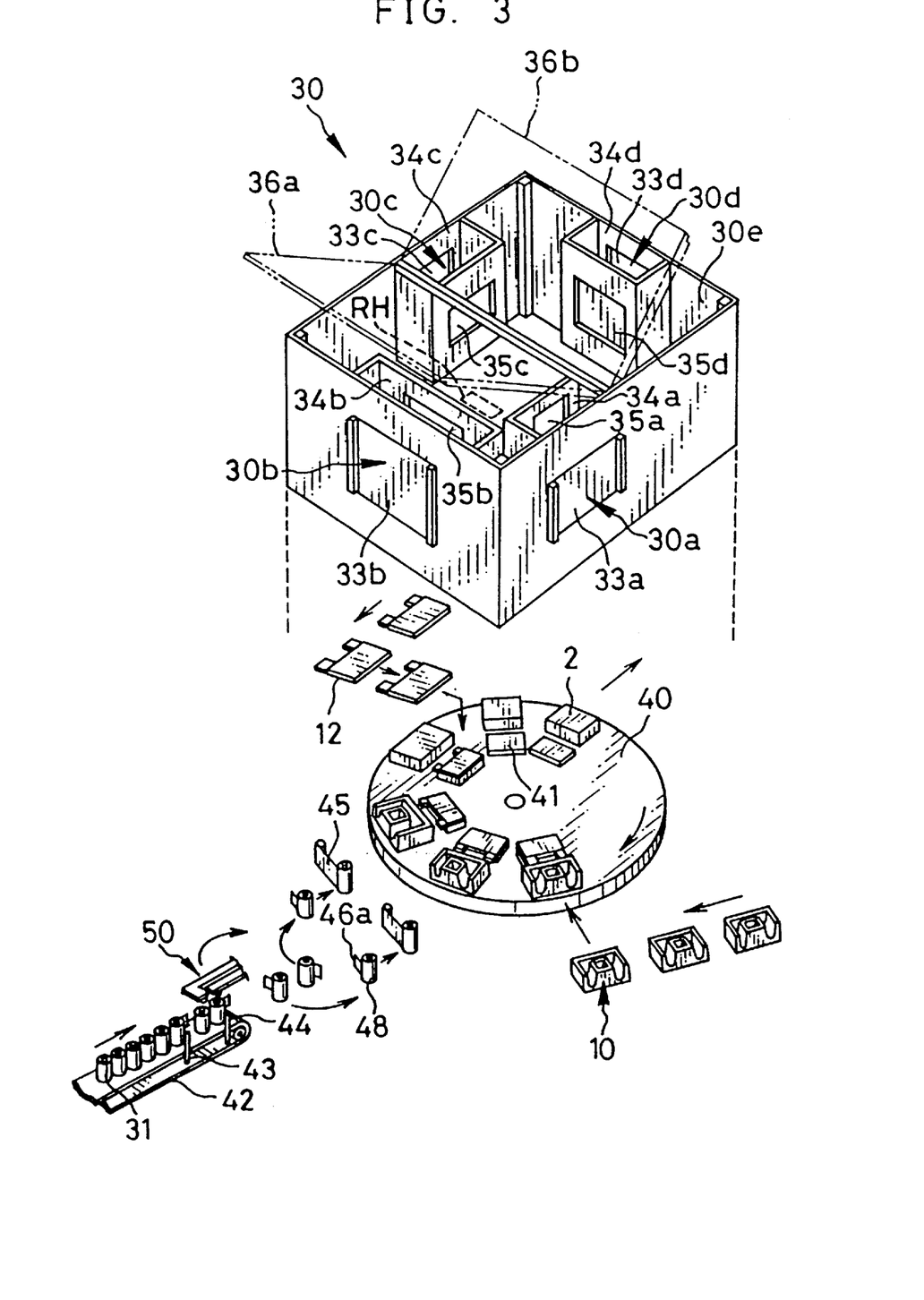
FIG. 3 is an explanatory view illustrating an overall arrangement of the loading apparatus of the preferred embodiment.

FIG. 3 illustrates the assembling apparatus of the preferred embodiment. A dark box 30 is designed so that the inside is shielded from ambient light, and is provided with a supply outer opening, 30a through which the main body 10 is supplied, a supply outer opening 30b through which a photo film cassette 31 is supplied, a supply outer opening 30c through which the rear cover 12 is supplied, and an exit outer opening 30d through which the housing 2 is exited after loading of the photo film 45. Before being supplied into the dark box 30, the main body 10 has been previously provided with a mechanism for taking photographs and the front cover 11.

Each of the supply outer openings 30a to 30c and the exit outer opening 30d is provided with an outer shutter plate 33a to 33d respectively, which are disposed in slidable fashion for shielding the dark box 30 from ambient light. Behind the shutters 33a to 33d are formed respective intermediate cells 34a to 34d. Each of the intermediate cells 34a to 34d has a respective inner shutter plate 35a to 35d for shielding light. The inner shutter 35a is interlocked with the outer shutter 33a, through a known linkage or the like, which must be closed before the inner shutter 35a can be opened, and vice versa. This interlocking structure also applies to the other pairs of shutters 33b to 33d and 35b to 35d. It is thus possible to protect constantly the inside of the dark box 30 from ambient light, with all the four intermediate cells 34a to 34d where the inside of the dark box 30 is accessible externally. A top 36 of the dark box 30 consists of two separately openable top plates 36a and 36b. When the top plates 36a and 36b are opened, an operator can inspect the shutters 33a to 33d and 35a to 35d and other relevant devices incorporated in the dark box 30.

A compartment 30e of the dark box 30 covers a turntable 40 in light-tight fashion. On the turntable 40 are mounted rear-cover holders 41 which hold each rear cover 12, and FIGS. 81 and 82, for receiving the main body 10 fixedly on the turntable 40 (See FIG. 6). A robot hand RH (one of which is schematically illustrated in FIG. 3) is disposed between each of the intermediate cells 34a to 34d and the turntable 40. The robot hands RH can be known devices, are associated with the intermediate cells 34a to 34c and are respectively operated to hold the main body 10, the cassette 31 and the rear cover 12 to place them on the turntable 40. The robot hand associated with the intermediate cell 34d is operated to pick up the housings 2 from the turntable 40, and place them into the intermediate cell 34d.

Outside the supply outer opening 30b is disposed a conveyor 42, which consecutively conveys the cassettes 31 in an erect orientation. Near the end of the conveyor 42, an escapement 43 is disposed and separates first and second advancing cassettes from the remaining cassettes in a known manner. A stopper 44 is disposed to stop the first cassette in the fixed position in a known manner.

The photo film 45 of the cassette 31 has a leader 46, of which a width is reduced at a leading tongue 46a. The cassette 31 conveyed on the conveyor 42 has a form such that the leading tongue 46a is protruded from out of a passageway 48a in a cassette shell 48. This protrusion of the leading tongue 46a corresponds in length to a range of the three successive perforations 45a, as illustrated in FIG. 4A.

The conveyor 42 can be installed in an illuminated room because only such a small range of the leading tongue 46a is protruded from the cassette shell 48.and exposed to the ambient light. Therefore, it is possible to minimize the loss of useable photo film 45 and utilize a definitely greater portion of the photo film 45 for photography. Also, it is easy to handle the cassette 31 in aligning and conveying processes.

Figure 4A:
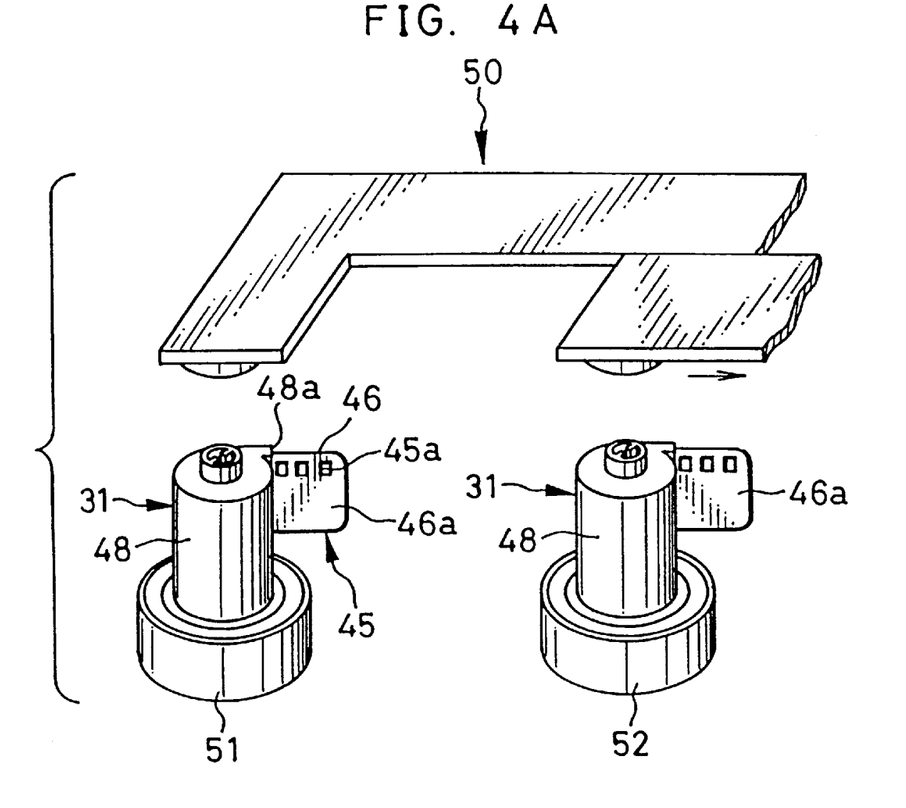
FIGS. 4A and 4B are explanatory views illustrating photo film cassettes handled while conveyed into a dark box in the preferred embodiment.
Figure 4B:
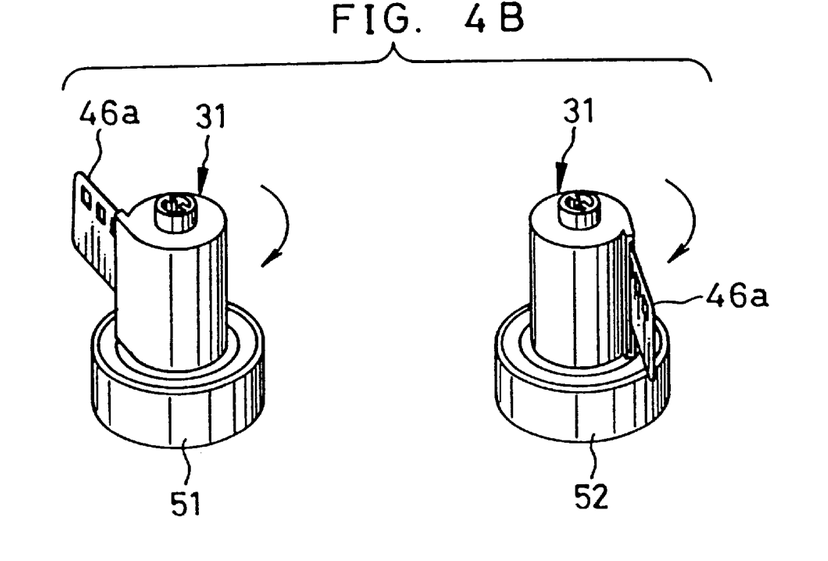

FIG. 4A illustrates a conveyance-separating loader 50 which is disposed in the intermediate cell 34b. The loader 50 is extended through the supply outer opening 30b while the outer shutter 33b is opened, and simultaneously picks up the two cassettes 31 from the conveyor 42, via suction or the like, to move them into the intermediate cell 34b. As depicted in FIG. 4A, the loader 50, while raising the two cassettes 31 enlarges the interval between them, by a relative sliding motion of two parts thereof, and then places the cassettes 31 on rotary holders 51 and 52 incorporated in the intermediate cell 34b. Each of the rotary holders 51 and 52 has a vacuum chuck mechanism for sucking and retaining a bottom of each cassette 31 and a rotating mechanism for rotating the cassette 31. As illustrated in FIG. 4B, the cassettes 31 are rotated to orient the leading tongue 46a in respective predetermined directions.

Figure 5A:
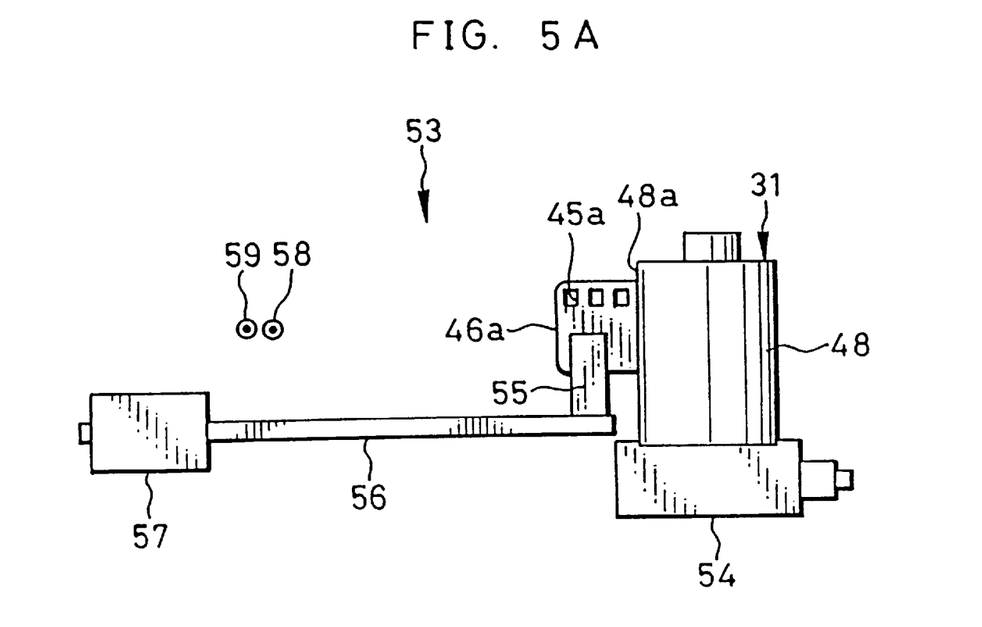
FIGS. 5A and 5B are explanatory views illustrating a station in which a leader is pulled from the cassette in the preferred embodiment.
Figure 5B:
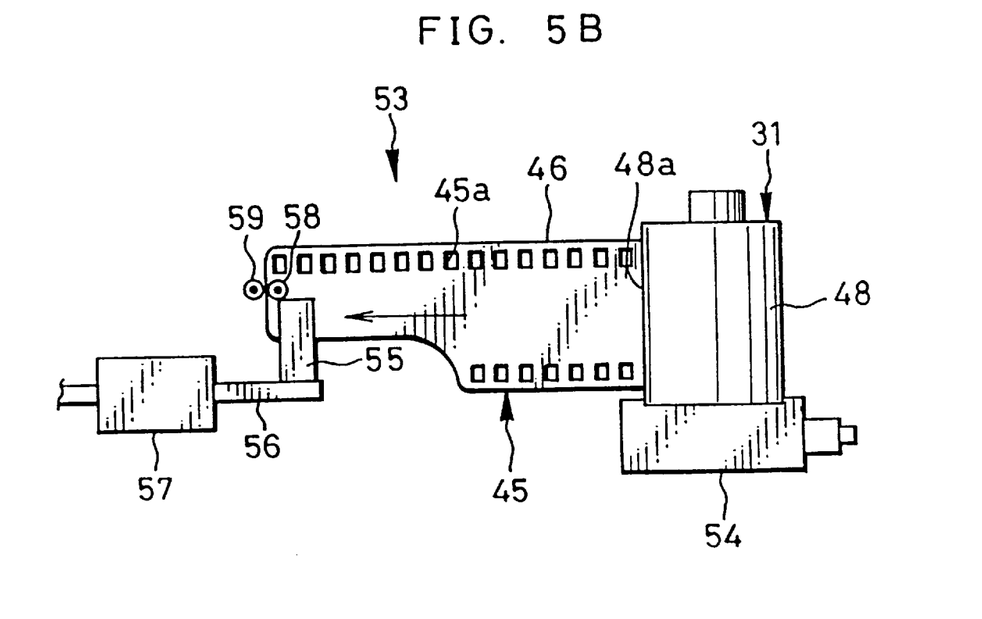

As illustrated in FIGS. 5A and 5B, each cassette 31, as oriented, is set in a leader pulling station 53 disposed between the intermediate cell 34b and the turntable 40. The leader pulling station 53 consists of a cassette holder 54 for sucking and retaining the cassette shell 48, a pick-up section 55 for picking up the leading tongue 46a, an arm 56 having the pick-up section 55 fixed thereon, and a solenoid 57 for driving the arm 56. Two photo sensors 58 and 59 are disposed proximate the solenoid and serve to check accuracy of the protruding length of the leader 46 as pulled, e.g., to cause 15 perforations 45a to protrude from the cassette shell 48. The sensors 58 and 59 detect the distal edge of the leading tongue 46a. Immediately upon detection of the edge at the sensor 58, the solenoid 57 is braked. Upon detection of the same at the sensor 59, the solenoid 57 is completely stopped from driving the arm 56. Note that the dark box 30 contains two juxtaposed leader pulling stations 53, which handle each cassette 31 from the rotary holders 51 and 52, and operate simultaneously.

Figure 6:
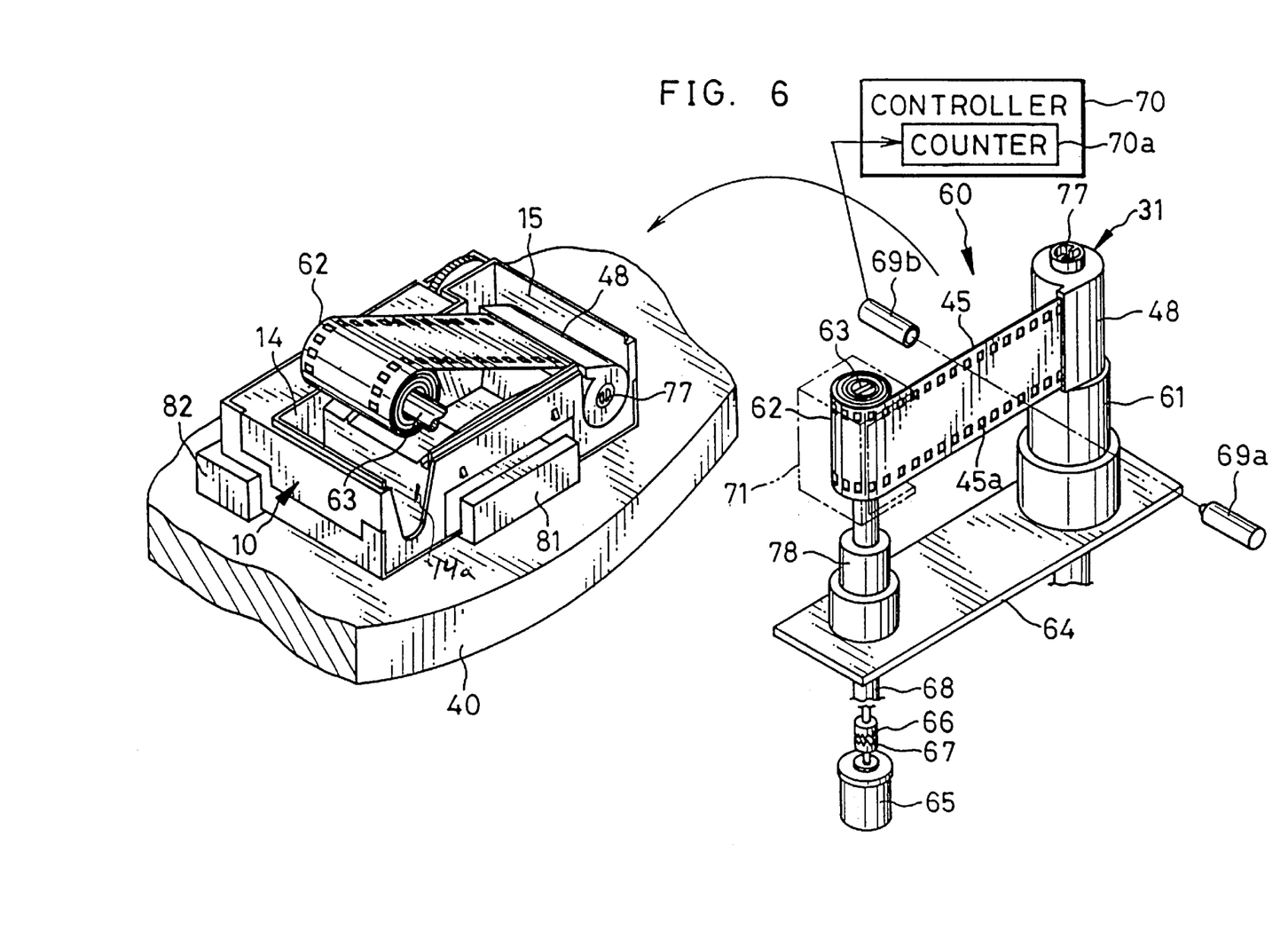
FIG. 6 is an explanatory view illustrating a station for forming the photo film into a roll and a station for loading the main body with the roll in the preferred embodiment.

In FIG. 6, the cassette 31 with the leader 46 pulled out is carried to, and set in, a roll forming station 60, which consists of a cassette holder 61 for sucking and retaining the cassette shell 48, a roll forming fork-device 63 (See FIG. 7) for picking up the leading tongue 46a and for rotating to form the photo film 45 into the roll 62, a shifter device 64 having the cassette holder 61 as well as the fork device 63 mounted on a base plate, and a fork motor 65 incorporated under the shifter device 64 for rotating the fork device 63. Note that the fork motor 65 is linked with a rod 68 integral with the fork device 63, in disengageable fashion via gears 66 and 67. It is further to be noted that the dark box 30 contains two juxtaposed roll forming stations 60, which handle each cassette 31 from the leader pulling stations 53, and operate simultaneously.

Between the cassette holder 61 and the fork device 63, is a photo sensor 69 which consists of a beam projector 69a and a beam receiver 69b for detecting a beam from the projector 69a. Presence and absence of the beam at the receiver 69b represents each passage of a perforation 45a. The number of the beam detections, and thus the number of perforations, are counted by a counter 70a. A controller 70 determines the amount of winding the photo film 45 while processing the count value of the counter 70a. In the course of the winding around the fork device 63, a photo film guide 71, indicated by the two-dot-chain lines, remains mounted on the fork device 63, and contacts both lateral edges of the photo film 45 to neaten the roll 62 while the photo film 45 is wound.

Figure 7:
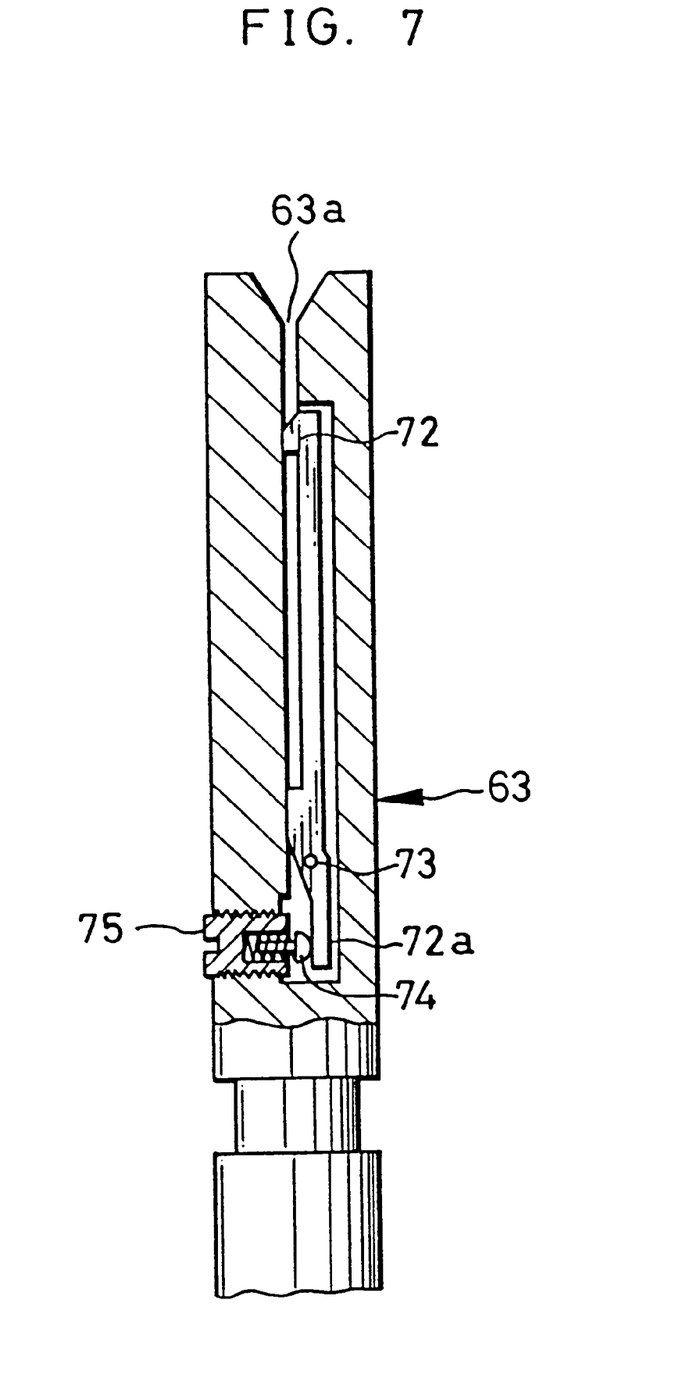
FIG. 7 is an elevation, partially in section, illustrating a fork device in the roll forming station of the preferred embodiment.

FIG. 7 illustrates the fork device 63, which incorporates a hook 72. When the leading tongue 46a is inserted in a slot 63a, the hook 72 is engaged with one of the perforations 45a in the leading tongue 46a. The hook 72 is rotatable about a shaft 73 and has an opposite distal end 72a which is in contact with a pressing pin 74 biased by a spring. The pressing pin 74 is contained in a recess of a screw 75, which is threadably fitted through a bottom portion of the fork device 63. When the screw 75 is rotated by a screwdriver, the hook 72 is adjusted to have a desired force of retaining the leading tongue 46a of the photo film 45. It is desirable to set the retaining force so that a force, which axially retracts the fork device 63 from the roll 62 of the photo film 45, can easily remove the fork device 63 from the roll 62 while the roll 62 is received in the photo film chamber 14.

The shifter device 64 is swingable through an approximate range of 90 degrees. As illustrated in FIG. 6, the orientation of the shifter device 64 is changed, before access of the cassette shell 48 and the roll 62 to the main body 10, so that a spool 77 in the cassette 31 extends parallel with a surface defined by the turntable 40. The cassette holder 61 is slidable between projected and retracted positions. A slider.78 is associated with the fork device 63 and is also slidable between projected and retracted positions. Before the cassette shell 48 and the roll 62 are mounted on the main body 10, the cassette holder 61 and the slider 78 are slid and projected toward the main body 10 simultaneously.

Figure 8A:
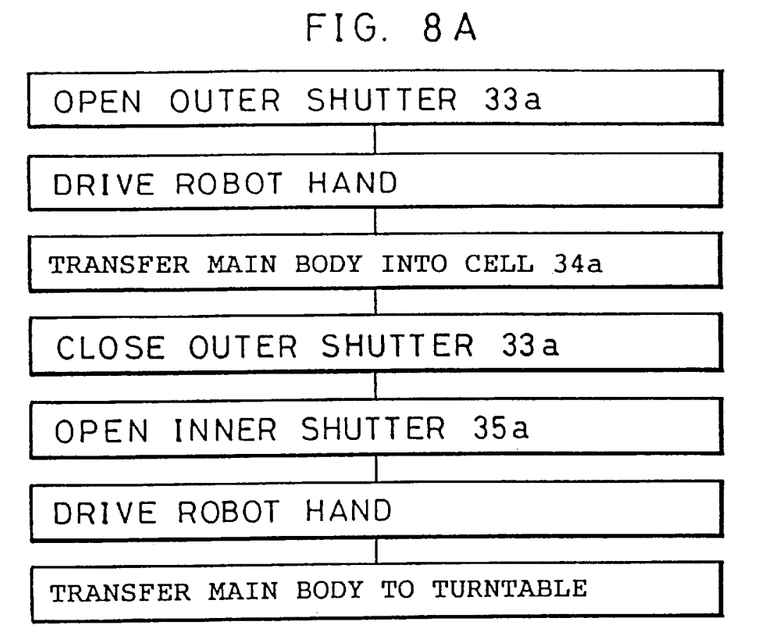
FIG. 8A is a flow chart illustrating an operation of transferring the main body into the dark box in the preferred embodiment.
Figure 8B:
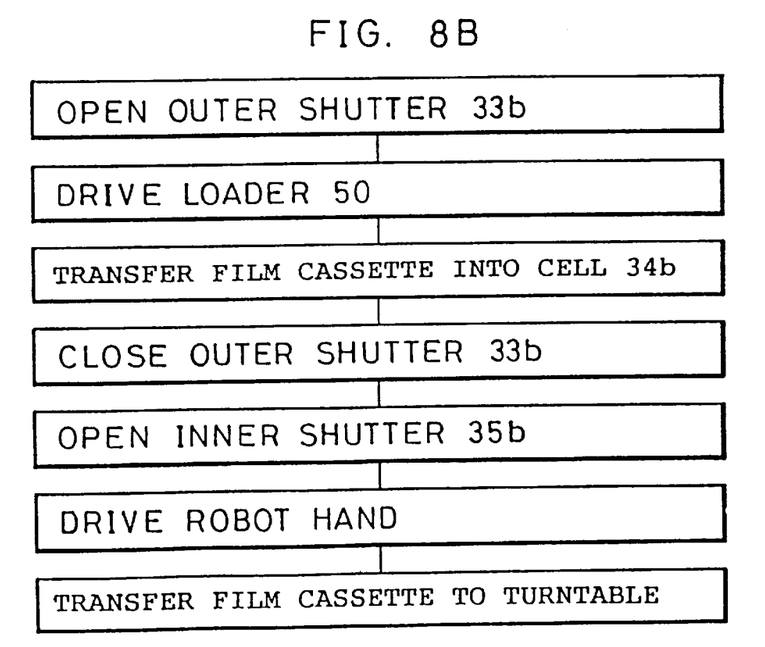
FIG. 8B is a flow chart illustrating an operation of transferring the photo film cassette into the dark box in the preferred embodiment.
Figure 8C:
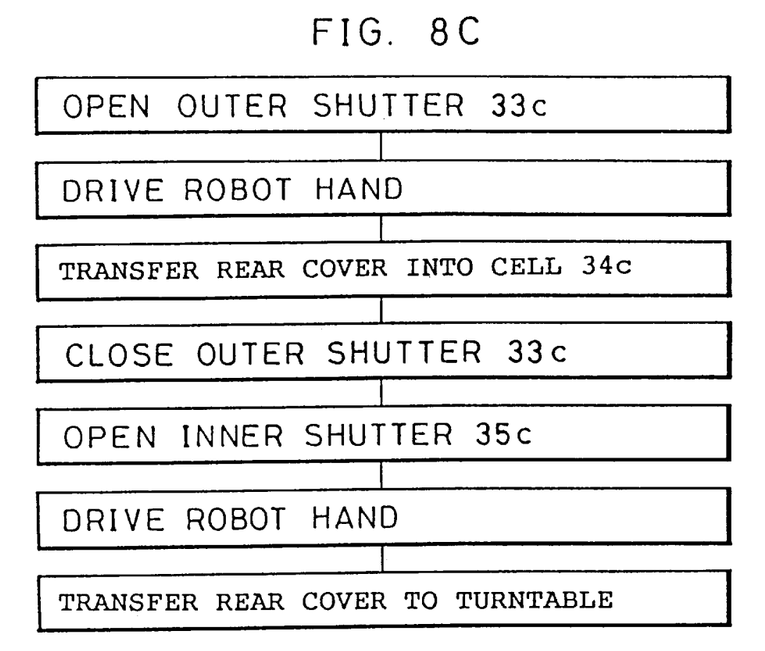
FIG. 8C is a flow chart illustrating an operation of transferring the rear cover into the dark box in the preferred embodiment.

Operation of the assembling apparatus is described below. As is illustrated in the flowchart of FIG. 8A, the outer shutter 33a of the dark box.30 is opened. The robot hand picks up the main body 10 with the front cover 11, and brings it into the intermediate cell 34a through the supply outer opening 30a. After the outer shutter 33a is closed, the inner shutter 35a is opened. The robot hand places the main body 10 on the turntable 40 between the support jigs 81 and 82, and fixes it on the turntable 40. The rear cover 12, as illustrated in the flow of FIG. 8C, is transferred into the dark box 30 through the intermediate cell 34c. The robot hand places the rear cover 12 on the rear-cover holder 41.

The cassettes 31 are conveyed by the conveyor 42. The first and second cassettes-Are separated from the remaining cassettes 31 by the escapement 43. The outer shutter 33b, as illustrated in FIG. 8B, is opened. The loader 50 simultaneously retains the two cassettes 31, and moves them into the intermediate cell 34b through the outer opening 30b. The two cassettes 31 are set on the rotary holders 51 and 52 before the outer shutter 33b is closed. The rotary holders 51 and 52 are then rotated. Each leading tongue 46a is thus oriented in the predetermined directions.

The inner shutter 35b is opened next. The robot hand RH sets each cassette 31 on the cassette holder 54 in the leader pulling station 53. The pick-up section 55 squeezes the leading tongue 46a before the arm 56 is driven by the solenoid 57. The leader 46 is then pulled out of the passageway 48a in the cassette shell 48. The distal end of the leading tongue 46a is detected by the sensor 58. Responsively the solenoid 57 is braked. The sensor 59 detects the leading tongue 46a. The arm 56 is stopped from driving. The leader 46 is then pulled out of the cassette shell 48 as long to the predetermined length.

The cassette 31 is conveyed into the roll forming station 60. The cassette shell 48 is sucked by and retained on the cassette holder 61. The leading tongue 46a is inserted in the slot 63a in the fork device 63. Then the fork device 63 is rotated, and winds the photo film 45. The guide 71 neatly forms end faces of the roll 62 of the photo film 45. The perforations 45a detected by the sensor 69 are counted by the counter 70a, of which the count value is checked by CPU 70. CPU 70 according to the count value determines how many perforations are in the cassette shell 48. As soon as there remain a small number of perforations on the spool, for example from zero to three, or from zero to four, then the fork device 63 is stopped. The guide 71 is then removed from the fork device 63.

The cassette holder 61 and the slider 78 are slid and extended. The spool 77 is oriented to be parallel with the turntable 40. The shifter device 64 is then inclined through 30 degrees so that the roll 62 is raised over the cassette shell 48. The cassette shell 48 is mounted on the cassette containing chamber 15. An advancing end of the spool 77 is engaged with the fork 16. Then the shifter device 64 swings down about the spool 77 through 30 degrees. The roll 62 is thus mounted into the photo film chamber 14.

The rear cover 12, supplied as in FIG. 8C, is fitted on the main body 10, and pressed against it. The retaining projections 18 and 19 are fitted in the openings 22 and 23, to retain the rear cover 12 on the main body 10. The cassette shell 48 is released from the suction of the cassette holder 61. The cassette holder 61 and the slider 78 are then retracted. The bottom face of the roll 62 comes into contact with the stopper 14a. As fork device 63 is withdrawn from the roll 62, the roll 62 is thus kept in the photo film chamber 14. The bottom lids 24 and 25 are closed, to obtain the housing 2 which is loaded with the photo film 45.

Figure 8D:
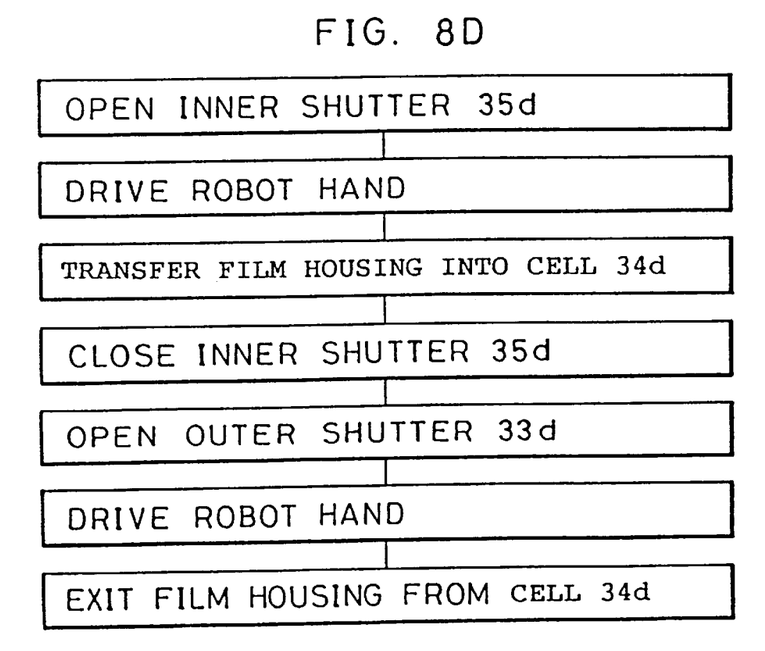
FIG. 8D is a flow chart illustrating an operation of transferring the photo film housing out of the dark box in the preferred embodiment.
Figure 9:
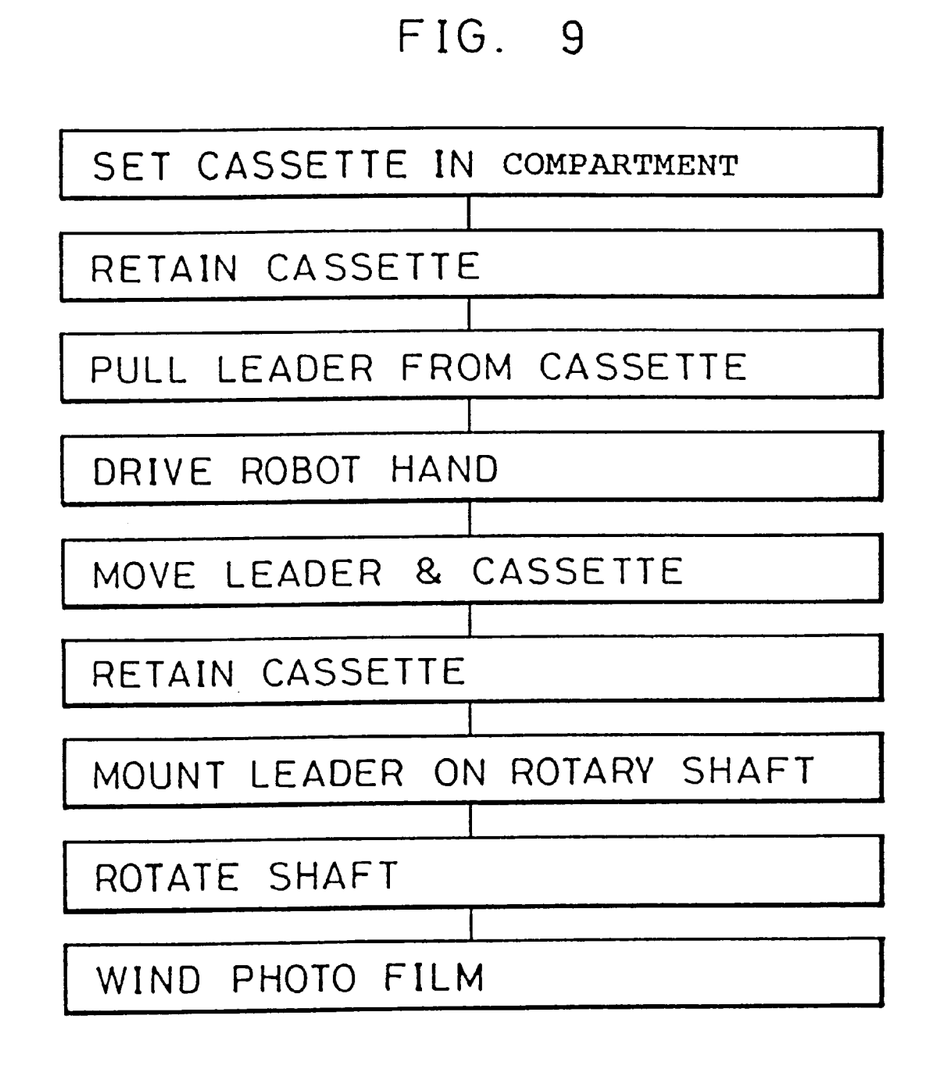
FIG. 9 is a flow chart illustrating an operation of winding the photo film into a roll in the preferred embodiment.

The turntable 40 is rotated. The housing 2 is brought to confront the intermediate cell 34b. As is illustrated in FIG. 8D, the inner shutter 35d is opened. The robot hand transfers the housing 2 into the intermediate cell 34d. Then the inner shutter 35d is closed, before the outer shutter 33d is opened. The housing 2 is exited from the intermediate cell 34d and from the dark box 30. The housing 2 is conveyed by a conveyor belt to a following process in which the housing 2 is covered by the cardboard wrapper 3.

Note that, in the above embodiment, the two rolls 62 of the photo films 45 are formed simultaneously. The two cassettes 31 are inserted into each main body 10 simultaneously. This is preferable in view of efficiency in loading. However the present invention is applicable to an assembling apparatus in which a single roll 62, or more than two rolls of the photo film 45 is formed at one time, and the single cassette 31 inserted into the main body 10 at one time.

In the above, the winding amount of the photo film 45 is measured by counting the number of perforations 45a. Alternatively, the winding amount of the photo film 45 may be measured by use of a rotary encoder, or the like, associated with the fork motor 65. The winding amount can also be represented by the number of pulses of rotation of the fork motor 65. Otherwise, the winding amount may be measured by combination of a rotary encoder and nip rollers, which may be arranged in a path of the photo film, and whose amount of rotation can be read by the rotary encoder. Alternatively, the winding amount may be measured by use of an impeller associated with the fork motor. The winding amount can be represented by the number of pulses of the impeller.

In the above embodiment, the main body 10 is laid on the turntable. The cassette 31 with the photo film 45 are erect on the shifter device 64, and swung down before loading into the main body 10. Alternatively the main body 10 may be erected on the turntable. The cassette 31 with the photo film 45 can be kept erect during loading into the main body 10.

In the above, the assembling apparatus is adapted to loading the lens-fitted photo film unit with the photo film 45. However the present invention is applicable to any system for loading of photosensitive material.

In the above embodiment, the turntable 40 is used for consecutively conveying the main body 10. The dark box 30 has a rectangular shape. Alternatively a conveyor-mechanism of an endless type may be used to convey the main body 10 along an orbital path. A dark box for use with such a conveyor can be shaped like a doughnut, or the like.

Finally, control and activation of the various doors, robot arms and other components can be accomplished through known controllers such as preprogrammed microprocessor, and known drive components, such as motors, solenoids and cylinders.

Although the present invention has been fully described by way of the preferred embodiments thereof with reference to the accompanying drawings, various changes and modifications can be made without departing from the scope of the present invention, as defined by the appended claims.

What is claimed is:

1. An apparatus for assembling a lens-fitted photo film unit including a main body defining a cassette containing chamber and a photo film chamber, a photo film cassette having a spool loaded into the cassette containing chamber, unexposed photo film drawn out of the photo film cassette and wound into a roll contained in the photo film chamber, and a photo film winding wheel mounted over the cassette containing chamber which is rotated after each exposure of the photo film such that the spool rotates therewith and the photo film winds about the spool, the apparatus comprising:

a dark box comprising an outer wall defining an enclosed light-shielded compartment;

a plurality of cells formed on an inner periphery of said outer wall, with each of said cells defined by an inner wall, respectively;

a plurality of outer openings formed in said outer wall, with each of said outer openings being in communication with one of said cells, respectively;

an inner opening formed in each of said inner walls and being in communication with one of said cells, respectively;

an outer shutter plate associated with each of said outer openings, respectively;

an inner shutter plate associated with each of said inner openings, respectively, wherein said outer shutter plates and said inner shutter plates are adapted to alternatively cover and uncover their respective openings to maintain said compartment shielded from light;

photo film cassette supplying means for transferring a photo film cassette having a leader of photo film protruding therefrom into said compartment from one of said cells through the inner opening in communication with said one cell while the outer shutter plate associated with the outer opening in communication with said one cell covers this outer opening;

roll forming means, disposed in said compartment, for receiving said photo film cassette from said photo film cassette supplying means and winding a predetermined length of the photo film drawn out from said photo film cassette into a roll; and photo film mounting means, disposed in said compartment, for moving said roll and said photo film cassette from said roll forming means to a main body, and for mounting said roll into the photo film chamber of the main body and said photo film cassette into the cassette containing chamber of the main body, wherein the photo film mounting means changes the orientation of said roll and said photo film cassette as said roll and photo film cassette are moved from said roll forming means to the main body.

2. The apparatus according to claim 1, wherein said roll forming means comprises:

pulling means for pulling said leader, and thereby pulling said photo film out of said photo film cassette; and winding means for receiving said leader pulled by said pulling means, and then winding said photo film into said roll.

3. The apparatus according to claim 2, and further comprising:

a second conveyor means, located outside of the dark box, for conveying a plurality of the photo film cassettes in alignment with one another toward said one cell;

an escape means for separating a first two of the aligned photo film cassettes conveyed by said second conveyor means from remaining aligned photo film cassettes;

means for transferring said first two photo film cassettes into said one cell; and two rotary holding means disposed in said one cell for holding and rotating said first two photo film cassettes, and thereby adjust orientation of the leader of the first two photo film cassettes.

4. The apparatus according to claim 1, and further comprising:

main body supplying means for transferring the main body into said compartment from a second of said cells through the inner opening in communication with said second cell while the outer shutter plate associated with the outer opening in communication with said second cell covers this outer opening; and conveyor means, disposed in said dark box, for receiving the main body from said main body supplying means and for moving then main body to each of said cells.

5. The apparatus according to claim 4, wherein said roll forming means further comprises a cassette holding means in said compartment for holding the photo film cassette, supplied by said photo film cassette supplying means, while said winding means winds the photo film into the roll.

6. The apparatus according to claim 5, wherein said cassette holding means and said winding means are disposed on said photo film mounting means and spaced from one another by a distance that corresponds to a distance by which the cassette containing chamber and the photo film chamber are spaced from each other.

7. The apparatus according to claim 6, wherein said roll forming means further comprises an auxiliary cassette holding means, disposed in said compartment, for holding said photo film cassette while said pulling means pulls the leader.

8. The apparatus according to claim 6, wherein the lens-fitted photo film unit further comprises a rear cover secured to a rear portion of the main body, and a front cover secured to front portion of the main body, and wherein said apparatus further comprises rear cover supplying means for transferring a rear cover into said compartment from a third of said cells through the inner opening in communication with said third cell while the outer shutter plate associated with the outer opening in communication with said third cell covers this outer opening.

9. The apparatus according to claim 5, wherein said pulling means comprises:

a holding means for holding the leader; and a solenoid that drives the holding means away from the photo film cassette while the leader is held by the holding means.

10. The apparatus according to claim 5, wherein said roll forming means further comprises:

sensing means, disposed in a path of the leader while pulled from the photo film cassette, for detecting passage of a distal end of the leader; and control means for stopping said pulling means in response to detection of the distal end.

11. The apparatus according to claim 5, wherein said roll forming means further comprises:

sensing means, disposed between said cassette holding means and said winding means, for detecting perforations in the photo film;

counting means, supplied with an output of said sensing means, for counting the perforations in the photo film to detect a moving amount of the photo film; and control means for stopping said winding means when the photo film within the photo film cassette has a predetermined length according to the moving amount.

12. The apparatus according to claim 4, wherein said roll forming means further comprises a guide means, mounted on said winding means, for contacting lateral edges of the photo film and tightening turns of the photo film.

* * * * *